(12) United States Patent
Zhong et al.

(10) Patent No.: US 11,584,650 B2
(45) Date of Patent: Feb. 21, 2023

(54) GRAPHENE OXIDE AND METHOD OF PRODUCTION THEREOF

(71) Applicant: BAOSHAN IRON & STEEL CO., LTD., Shanghai (CN)

(72) Inventors: Yulin Zhong, Victoria (AU); Dan Li, Victoria (AU); George Philip Simon, Victoria (AU)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 863 days.

(21) Appl. No.: 16/061,233

(22) PCT Filed: Dec. 14, 2015

(86) PCT No.: PCT/CN2015/097227
§ 371 (c)(1),
(2) Date: Jun. 11, 2018

(87) PCT Pub. No.: WO2017/100968
PCT Pub. Date: Jun. 22, 2017

(65) Prior Publication Data
US 2018/0362349 A1    Dec. 20, 2018

(51) Int. Cl.
*C01B 32/225*         (2017.01)
*C01B 32/19*          (2017.01)
(Continued)

(52) U.S. Cl.
CPC ........... *C01B 32/225* (2017.08); *C01B 32/19* (2017.08); *C01B 32/198* (2017.08); *C01B 32/23* (2017.08);
(Continued)

(58) Field of Classification Search
CPC ..... C01B 32/225; C01B 32/19; C01B 32/198; C01B 32/23; C01B 32/194;
(Continued)

(56) References Cited

U.S. PATENT DOCUMENTS 9,991,391 B2 *   6/2018   Dai .................. H01L 29/78684
2013/0161199 A1 * 6/2013  Li ........................... C01B 32/19
                                                                    205/341
(Continued)

FOREIGN PATENT DOCUMENTS

CN       1061387 A       5/1992
CN       102372268       3/2012
(Continued)

OTHER PUBLICATIONS

Office Action dated Jan. 29, 2021 for Chinese Patent Application No. 201580085340.1.
(Continued)

*Primary Examiner* — Salil Jain
(74) *Attorney, Agent, or Firm* — Lei Fang, Esq.; Smith Tempel Blaha LLC

(57) ABSTRACT

A method of producing an electrochemically derived graphene oxide and product produced therefrom. The method comprises locating graphite particles within an electrochemical cell having a working electrode, counter electrode, and an aqueous acid electrolyte, the working electrode being positioned within the electrolyte to contact at least a portion of the graphite particles; agitating the graphite particles within the electrolyte; and applying a potential difference between the working electrode and counter electrode, thereby resulting in electrochemical exfoliation and oxidation of the graphite particles to produce graphene oxide.

18 Claims, 14 Drawing Sheets

(51) Int. Cl.
    C01B 32/198    (2017.01)
    C25B 1/00      (2021.01)
    C25B 9/19      (2021.01)
    C25B 9/40      (2021.01)
    C25B 11/043    (2021.01)
    C25B 15/00     (2006.01)
    C01B 32/23     (2017.01)
    C25B 13/02     (2006.01)
    C25B 13/04     (2021.01)
(52) U.S. Cl.
    CPC ................. *C25B 1/00* (2013.01); *C25B 9/19*
        (2021.01); *C25B 9/40* (2021.01); *C25B 11/043*
        (2021.01); *C25B 13/02* (2013.01); *C25B 13/04*
        (2013.01); *C25B 15/00* (2013.01); *C25B 9/43*
        (2021.01)
(58) Field of Classification Search
    CPC ............ C01B 2204/32; C01B 2204/22; C01B
                    2204/02; C25B 9/19; C25B 9/40; C25B
                    11/043; C25B 1/00; C25B 13/02; C25B
                    13/04
    See application file for complete search history.

(56)             References Cited

U.S. PATENT DOCUMENTS

| 2014/0061059 | A1* | 3/2014 | Dryfe ................... | B82Y 40/00 |
|---|---|---|---|---|
| | | | | 205/555 |
| 2017/0314141 | A1* | 11/2017 | Xu ....................... | B82B 3/0009 |
| 2018/0282164 | A1* | 10/2018 | Abdelkader ............ | C01B 32/19 |

FOREIGN PATENT DOCUMENTS

| CN | 102534642 A | | 7/2012 |
|---|---|---|---|
| CN | 103183332 A | | 7/2013 |
| CN | 103204494 A | | 7/2013 |
| CN | 103359712 | | 10/2013 |
| CN | 103991862 A | | 8/2014 |
| CN | 104370286 A | | 2/2015 |
| CN | 104477882 A | * | 4/2015 |
| CN | 104876211 A | | 9/2015 |
| CN | 104894594 | | 9/2015 |
| CN | 105000552 A | | 10/2015 |
| CN | 104003375 B | * | 11/2015 |
| JP | 2000106182 A | * | 4/2000 |
| RU | 2305071 C2 | * | 8/2007 |
| TW | 201326035 A | | 7/2013 |
| WO | 2001089992 A1 | | 11/2001 |
| WO | 2011162727 A1 | | 6/2010 |
| WO | 2014062217 A1 | | 10/2012 |

OTHER PUBLICATIONS

ZhaoXian Zhang; et al. "Titanium Electrode Reaction Engineering" Metallurgical Industry Press, the 1st edition, Apr. 2009.
MingLong Zhang; et al. "Innovative progress in the field of materials in Foreign Countries", Property Press, the 1st edition, Jun. 2015.
Office Action dated Dec. 3, 2019 for Japanese Patent Application No. 2018-530711, along with the Machine translation.
PCT/CN2015/097227International Search Report and Written Opinion dated Sep. 14, 2016.
Chuang, C. H., C. Y. Su, et al. (2015). "A green, simple and cost-effective approach to synthesize high quality graphene by electrochemical exfoliation via process optimisation." RSC Advances, 5: 54762-54768.
Wang, Z., Manga, K. K., Bao, Q. &Loh, K. P. High-Yield Synthesis of Few-Layer Graphene Flakes through Electrochemical Expansion of Graphite in Propylene Carbonate Electrolyte. J. Am. Chem. Soc. 133, 8888 (2011).
Su, C. Y., A. Y. Lu, et al. (2011). "High-Quality Thin Graphene Films from Fast Electrochemical Exfoliation." Acs Nano 5(3): 2332-2339.
Lotya, M., Y. Hernandez, et al. (2009). "Liquid Phase Production of Graphene by Exfoliation of Graphite in Surfactant/Water Solutions." Journal of the American Chemical Society 131(10): 3611-3620.
Zhong, Y. L., Z. Tian, et al. (2014). "Scalable production of graphene via wet chemistry: progress and challenges." Materials Today (in press).
Zhong, Y. L.&Swager, T. M. Enhanced electrochemical expansion of graphite for in situ electrochemical functionalization. J. Am. Chem. Soc.134, 17896 (2012).

* cited by examiner (a)

(b)

(a) Chemically-derived Graphene Oxide (GO)

(b) Electrochemically-derived Graphene Oxide (EGO)

GRAPHENE OXIDE AND METHOD OF PRODUCTION THEREOF

CROSS-REFERENCE TO RELATED APPLICATIONS

This application is a 371 U.S. National Phase of PCT International Application No. PCT/CN2015/097227 filed on Dec. 14, 2015, which is incorporated by reference herein in its entirety.

TECHNICAL FIELD

The present invention generally relates to a method of producing graphene oxide and graphene oxide produce from this method having unique properties. The invention is particularly applicable to electrochemical production methods of graphene oxide and it will be convenient to hereinafter disclose the invention in relation to that exemplary application.

BACKGROUND OF THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Graphene oxide (GO) is a widely used precursor for production of graphene through the subsequent reduction of GO to reduced graphene oxide (rGO). GO is conventionally produced using a multi-step chemical synthesis processes such as Hummers method, involving harsh chemical oxidation of graphite. Such chemical routes have a high yield, scalability and producing a product that has good dispersibility in various solvents. However, this route has several disadvantages including explosive risks, and metal ions ($Mn^{2+}$) contamination issues. Most importantly, the use of strong oxidizing agent such as $KMnO_4$, $K_2FeO_4$ and $KClO_3$ can introduce irreparable hole defects which detrimentally affects the electrical conductivity of the product even after reduction by chemical or thermal methods.

Electrochemical exfoliation of graphite has been developed to overcome a number of the disadvantages of the above chemical method. Electrochemical exfoliation of graphite exfoliation involves the intercalation of molecules or ions between graphite layers through electrochemical activation. Moreover, graphene produced by electrochemical exfoliation method contains a lower proportion of hole defects and oxygen functional groups compared to the chemical method.

In existing electrochemical exfoliation methods, bulk graphite such as graphite rod, graphite foil or high orientated pyrolytic graphite (HOPG) are employed as the electrodes in an electrochemical cell. Such electrodes need to be preforming from graphite flakes or machining of a large graphite ingot to form the electrode. The need to preform such bulk graphite electrodes introduces extra cost, and can affect the reproducibility of electrochemical exfoliation through batch variation of graphite electrodes. Furthermore, uniform and complete oxidation is difficult to achieve using bulk graphite electrodes, as such graphite electrodes often exfoliate into few or multi-layer graphene (and lose electrical contact) before complete oxidation or functionalisation can occur. Moreover, the size of the graphite electrodes can also affect the electrochemical exfoliation efficiency. All these factors limit the scalability of existing electrochemical exfoliation techniques.

It would therefore be desirable to provide an improved and/or alternate electrochemical exfoliation method for producing graphene oxide from graphite.

SUMMARY OF THE INVENTION

The present invention provides a method of producing graphene oxide comprising:

locating graphite particles within an electrochemical cell having a working electrode, counter electrode, and an aqueous acid electrolyte, the working electrode being positioned within the electrolyte to contact at least a portion of the graphite particles;

agitating the graphite particles within the electrolyte; and applying a potential difference between the working electrode and counter electrode, thereby resulting in electrochemical exfoliation and oxidation of the graphite particles to produce graphene oxide.

The present invention therefore provide an electrochemical exfoliation method in which graphite particles such as graphite flakes are agitated whist in electrical connection with a working electrode to form graphene oxide. Agitation of graphite particles within the electrolyte creates close physical/electrical contact of graphite particles with the working electrode; provide good mixing of graphite slurry formed within the electrolyte; and, in some embodiments, can provide a sufficient shear force to assist in exfoliation of oxidised graphene layers. Continuous agitation can allow partially exfoliated graphite flakes to contact the working electrode repeatedly for complete exfoliation. Furthermore, the use of graphite particles avoids the use of bulk graphite, reducing the high cost on graphite source and thus making the process more scalable.

Agitation of the graphite particles within the electrolyte is used to stir the loose graphite particles in electrolyte, and can providing additional shear forces to assist in exfoliating the graphite flakes. A variety of agitation systems, arrangements and methods can be used to agitate the graphite particles within the electrolyte. In embodiments, the graphite particles are agitated within the electrolyte by at least one of mechanical agitation, flow constriction or fluid flow characteristics. In those embodiments which use mechanical agitation, that agitation preferably comprises stirring.

In some embodiments, the agitation of the graphite particles within the electrolyte creates a shear force sufficient to assist in exfoliation of oxidised graphene layers. For example, agitation of the graphite particles within the electrolyte may preferably creates a flow velocity in the electrolyte of at least 0.1 m/s, preferably between 0.2 to 10 m/s, more preferably between 1 to 5 m/s, more preferably about 2 m/s. Additionally, it is preferred that agitation of the graphite particles within the electrolyte creates a graphite slurry vortex.

The working electrode can have any suitable configuration. In some embodiments, the working electrode comprises a receptacle within which the graphite particles are located, retained and separated from the counter electrode within the electrochemical cell. This arrangement advantageously separates the graphite particles from the counter electrode, whist allowing both electrolyte and current flow within the electrochemical cell. In some embodiments, the working electrode includes a membrane section having pores sized to retain graphite and GO particles within the working electrode. The membrane section facilitates electrolyte flow whilst retaining the GO and graphite particles within the working electrode receptacle. Preferably, the membrane section has a pore size of <2 μm, preferably <1 μm, more preferably <0.8 μm, more preferably around 0.6 μm.

In some embodiments, the working electrode includes a conductive mesh. The conductive mesh preferably comprises a metal mesh, preferably a platinum mesh.

The counter electrode can have any suitable configuration. In some embodiments, the counter electrode comprises a conductive body, preferably a metal body or carbon body.

Any suitable aqueous acidic electrolyte can be used in the electrolytic cell. In some embodiments, the aqueous acidic electrolyte includes molecules and/or ion components which facilitate the intercalation of graphite layers of the graphite particles. The aqueous acidic electrolyte is preferably selected from sulphuric acid, perchloric acid, nitric acid, phosphoric acid or boric acid.

Any suitable graphite particles can be located in the electrochemical cell. In embodiments, the graphite particles have an average particle size of from 10 μm to 25 mm, preferably from 50 μm to 10 mm, more preferably from 100 μm to 1 mm. The graphite particle can have any form desired. In exemplary embodiments, the graphite particles comprise graphite flakes.

The potential difference between the working electrode and counter electrode must be sufficient to initiate and maintain electrochemical exfoliation and oxidation of the graphite particles. In embodiments, the potential difference between the working electrode and counter electrode provide a current of at least 1 A therebetween.

A second aspect of the present invention provides an apparatus for producing graphene oxide by electrochemical exfoliation of graphite particles, the apparatus including:

a fluid housing configured to house an aqueous acid electrolyte;

a working electrode being positioned within the electrolyte and configured to engage graphite particles located in the apparatus;

a counter electrode separated from the working electrode and graphite particles;

a potentiostat for creating a potential difference between the working electrode and counter electrode; and an agitation arrangement, which in use, agitates the graphite particles within the electrolyte.

This second aspect of the present invention provides an electrochemical apparatus for forming electrochemically derived graphene oxide, which includes an agitation arrangement, preferably a mechanical agitation arrangement for enhancing electrochemical exfoliation and oxidation of the graphite particles to produce graphene oxide. As noted for the first aspect, agitation of graphite particles within the electrolyte 1) creates close physical/electrical contact of graphite particles with working electrode, (2) provide good mixing of graphite slurry and in some embodiments (3) a sufficient shear force to assist in exfoliation of oxidised graphene layers.

Again, a variety of agitation systems, arrangements and methods can be used to agitate the graphite particles within the electrolyte. In embodiments, the agitation arrangement comprises a mechanical agitation arrangement, preferably a stirring arrangement.

Again, the working electrode can have any suitable configuration. In embodiments, the working electrode comprises a receptacle within which the graphite particles are fed, retained and separated from the counter electrode within the electrochemical cell. In some embodiments, the working electrode includes a membrane section sized to retain graphite and GO particles within the working electrode. Embodiments of the working electrode can include a conductive mesh, preferably a metal mesh, more preferably a platinum mesh.

Again, the counter electrode can have any suitable configuration. In embodiments, the counter electrode comprises a conductive body, preferably a metal body or carbon body.

Any suitable aqueous acidic electrolyte can be used in the electrolytic cell. In some embodiments, the aqueous acidic electrolyte includes molecules and/or ion components which facilitate the intercalation of graphite layers of the graphite particles. The aqueous acidic electrolyte is preferably selected from sulphuric acid, perchloric acid, nitric acid, phosphoric acid or boric acid.

The method of the first aspect of the present invention is preferably performed using the apparatus of the second aspect of the present invention. The present invention can also relate to a graphene oxide formed from the method according to the first aspect of the present invention, preferably using the apparatus according to the second aspect of the present invention.

A third aspect of the present invention provides an electrochemically derived graphene oxide comprising oxygen functionalities that essentially consist of hydroxy and epoxy groups.

In this third aspect of the present invention, the inventors have found that the present invention can produce a high quality graphene oxide having a composition that cannot be produced by any other prior GO production method. This graphene oxide includes oxygen functionalities which substantially include no carbonyl functional groups, but rather consist essentially of hydroxy and epoxy groups. The graphene oxide composition of the present invention is unique to the GO production method of the present invention.

The electrochemically derived graphene oxide of the present invention is preferably characterized as a predominantly single layer graphene oxide, with good and stable dispersibility in solvent such as ethanol and DMF. Thus, the electrochemically derived graphene oxide is preferably a substantially single layer graphene oxide. In embodiments, the number fraction of monolayer graphene oxide sheets is between 50 and 90%, preferably between 60 and 80%, more preferably between 60 and 70%, yet more preferably about 66 w %. In embodiments, the mass fraction of monolayer graphene oxide sheets is between 30 and 40 wt %, preferably between 30 and 35 wt %, more preferably about 33 wt %.

The electrochemically derived graphene oxide of the present invention preferably exhibits lesser oxygen-containing functional groups, in particular, lesser carboxyl (COOH) functional groups compared to graphene oxide formed by other routes, which are known to be located at the graphene sheet edges or hole edges. In embodiments, the oxygen functionalities comprise less than 5% carbonyl groups, preferably less than 1% carbonyl groups, more preferably less than 0.05% carbonyl groups, preferably less than 0.01% carbonyl groups. With such a structure, the electrochemically derived graphene oxide preferably comprises:

20 to 25 atom % oxygen, preferably from 20 to 22 atom % oxygen; and 74 to 78 atom % carbon, preferably from 75 to 77 atom % carbon In some embodiments, the electrochemically derived graphene oxide comprises: about 21.0 atom % oxygen and about 76.4 atom % carbon.

The graphene oxide of the present invention has enhanced dispersibility compared to other electrochemical methods. In embodiments, the graphene oxide has a dispersibility of up to 1 mg/mL in water, preferably between 0.1 and 1 mg/L.

Advantageously, the presence of only thermally sensitive oxygen functional groups (epoxy, hydroxy) can allow the use of simple thermal reduction at low temperature to form highly conductive graphene sheet. In comparison, conventionally chemically-derived graphene oxide remains insulation after the similar thermal reduction treatment. In embodiments, the graphene oxide can undergo thermal reduction at temperatures between 150 to 400° C., preferably 150 to 250° C., more preferably about 200° C. to form a highly conductive graphene product. The resulting conductivity of the graphene product is preferably from $10^2$ to $10^3$ S·m$^{-1}$.

The present invention can also provide in forms an electrochemically derived graphene oxide according to the third aspect of the present invention formed from the method according to the first aspect of the present invention. It should be appreciated that the features disclosed in relation to that first aspect can be incorporated into this third aspect of the present invention and vice-versa.

BRIEF DESCRIPTION OF THE DRAWINGS

The present invention will now be described with reference to the figures of the accompanying drawings, which illustrate particular preferred embodiments of the present invention, wherein.

DETAILED DESCRIPTION

The present invention creates a scalable and cost-effective method of producing graphene oxide, which can be used to mass produce a functional graphene. The process or method of the present invention can produce a high quality graphene oxide having a composition that cannot be produced by any other prior GO production method. The graphene oxide composition of the present invention is unique to the graphene oxide production method of the present invention.

Figure 1:
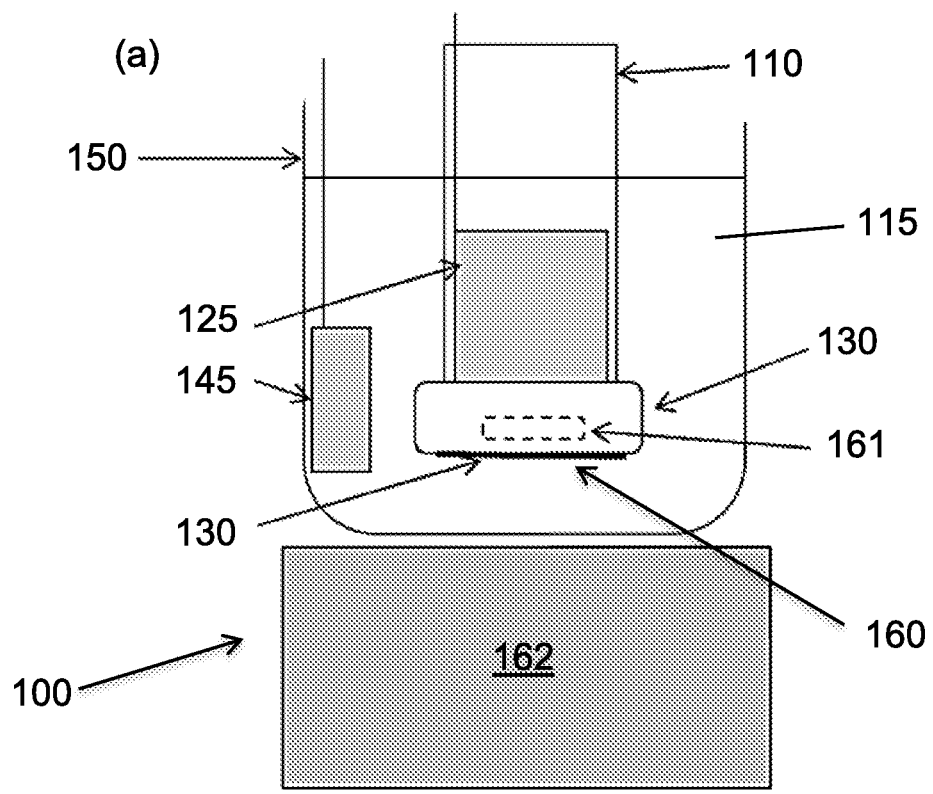
FIG. 1 provides (a) schematic drawing of a mechanically-assisted electrochemical setup according to one embodiment of the present invention; (b) perspective view of the same mechanically-assisted electrochemical setup.
Figure 1:
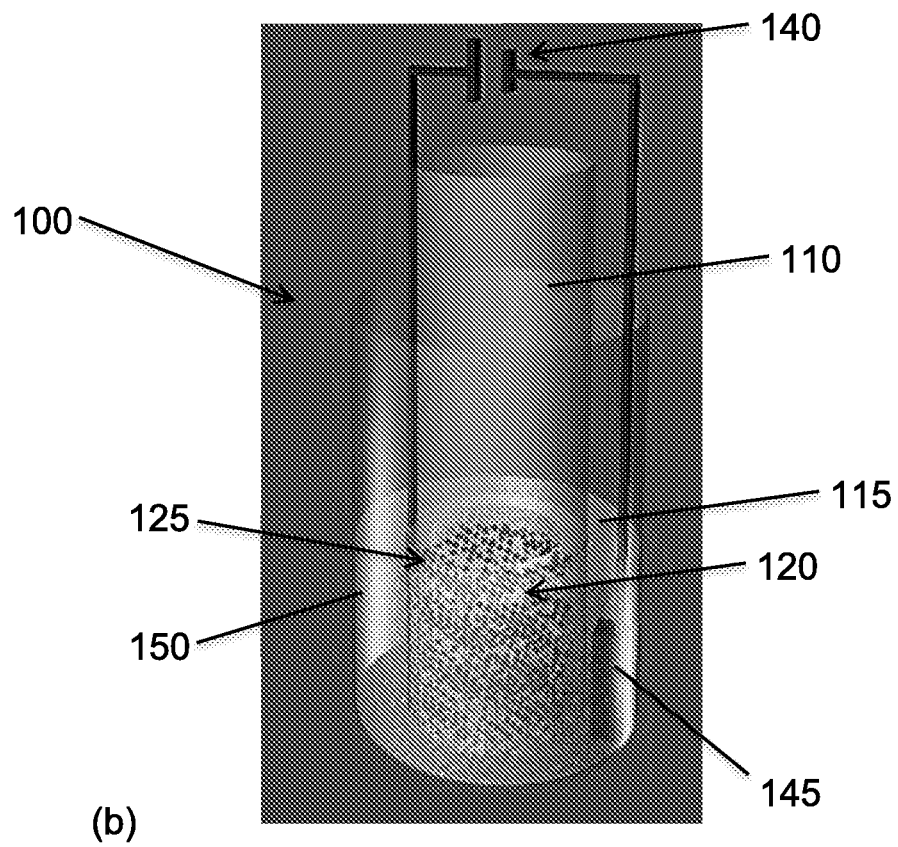

The method of producing graphene oxide of the present invention involves the use of mechanical stirring to assist in the electrochemical exfoliation of loose graphite flakes into oxidised graphene sheets, named herein as Electrochemical-derived Graphene Oxide (EGO). FIG. 1 illustrates an apparatus (100) used to produce graphene oxide according to the method or process of embodiments of the present invention. The key features of this apparatus set up are as follows:

1. Graphite Container (110)

The graphite container 110 comprises a fluid receptacle for containing an aqueous acid electrolyte 115 and graphite particles 120, which are typically supplied in the form of graphite flakes, and thereby confine the graphite particles close to the working electrode 125 but allowing electrolyte 115 and current to pass through. In embodiments, the graphite container 110 comprises a glass cylindrical container (inverted 50 mL centrifuge tube) having a base 130 formed from a piece of acid-resistance membrane (for example PVDF, PP, glass fibre, etc.) with pore size of <1 µm (typically 0.6 µm).

2. Working Electrode (125)

An inert, acid-resistance working electrode 125 (for example platinum, platinum-plated niobium, mixed metal oxide coated niobium, or the like) is positioned within the graphite container 110 to contact the graphite particles 120 contained in the graphite container 110. In the illustrated embodiment, the working electrode 125 is in the form of a foil or mesh is placed inside the graphite container 110 surrounding the peripheral of the wall of the graphite container 110. The working electrode 125 supplies positive current to the graphite particles 120 through physical contact therewith. Current is supplied via a two electrode configuration by a potentiostat or DC power supply 140. A positive terminal is applied to the working electrode 125 for oxidative exfoliation of graphite particles.

3. Electrolyte (115) and Counter Electrode (145)

The cylindrical graphite container 110 is immersed in a fluid tight outer container 150, for example a large capacity glass beaker, containing an electrolyte 115 comprising aqueous sulphuric acid (50 wt. %) filled to the desired level. A counter electrode 145 is immersed in the electrolyte 115 between the walls of the graphite container 110 and outer container 150. The counter electrode 145 is another inert, acid resistance electrode such as platinum mesh or conducting carbon cloth. A carbon electrode could also be used as the counter electrode 145 (cathode) as the cathodic reaction (mainly hydrogen production) does not damage the carbon electrode.

4. Agitation Arrangement 160—Mechanical Stirring

The graphite container 110 also includes an agitation arrangement 160 for agitating the electrolyte 115 and graphite particle 120 mixture (or "graphite slurry"). In the illustrated embodiment, the agitation arrangement 160 comprises a mechanical agitation arrangement, namely a stirrer. Mechanical stirring of the graphite slurry can be driven by various means such as a magnetic spin bar (via magnetic stirrer) or overhead stirrer/mixer. In the illustrated embodiment, the agitation arrangement 160 comprises a magnetic stirrer bar 161 and a magnetic stirrer driver 162. A sufficiently high stirring speed (typically >800 rpm, depending on size of graphite container and stirrer used) can be used to create a graphite slurry vortex in the graphite container for three reasons: (1) to create close physical/electrical contact of graphite particles with working electrode, (2) a sufficient shear force to assist in exfoliation of oxidised graphene layers and (3) provide good mixing of graphite slurry. In addition, continuous stirring can allow partially exfoliated graphite flakes to contact the working electrode repeatedly for complete exfoliation.

It should be appreciated that any form of graphite particles can be used in the method of the present invention. In preferred forms the wherein the graphite particles have an average particle size of from 10 μm to 25 mm, preferably from 50 μm to 10 mm, more preferably from 100 μm to 1 mm. In exemplary embodiments, the graphite particles comprise graphite flakes.

The above described and illustrated apparatus set up 100 confines and constantly well-mixes the graphite particles in the vicinity of the working electrode. This allows continuous and efficient electrochemical exfoliation and oxidation of graphite flakes into the desired electrochemical-derived graphene oxide. By application of a sufficiently high positive voltage, electrochemical exfoliation of the graphite particles through anion intercalation and oxidation through electrolysis of water is achieved.

Without wishing to be limited to any one theory, the Inventors consider that the mechanisms for mechanically-assisted electrochemical exfoliation and oxidation of graphite particles according to the method of the present invention are as such: a positive current/voltage is applied to the working electrode 125 such that the graphite particles/flakes 120 in contact with the working electrode 125 become positively charged, thus attracting dioxygen and hydroxyl ion and radical. This strong nucleophile can attack the $sp^2$ carbons at graphite edges and grain boundaries of the graphite particles 120, producing oxygen functional groups. The oxygen functional groups lead to expansion of graphite particles/flakes 120, which facilitate the intercalation of $SO_4^{2-}$ ions and water molecules. At the applied current and voltage, electrolysis of water to oxygen gas occurred at positive electrodes working electrode 125 and graphite particles/flakes 120) and the same can occur to the intercalated water in the graphite inter gallery, hence contributing to the graphite exfoliation process. Apart from electrochemical exfoliation, the stirring spin bar 161 creates shear forces between graphite layers, assisting in exfoliation of graphite particles/flakes 120, and the continuous stirring caused encouraged repeated exfoliation and oxidation. Eventually, the combination of repeated electrochemical exfoliation and oxidation processes eventually transformed the graphite flakes into graphene oxide (or EGO).

Figure 2:
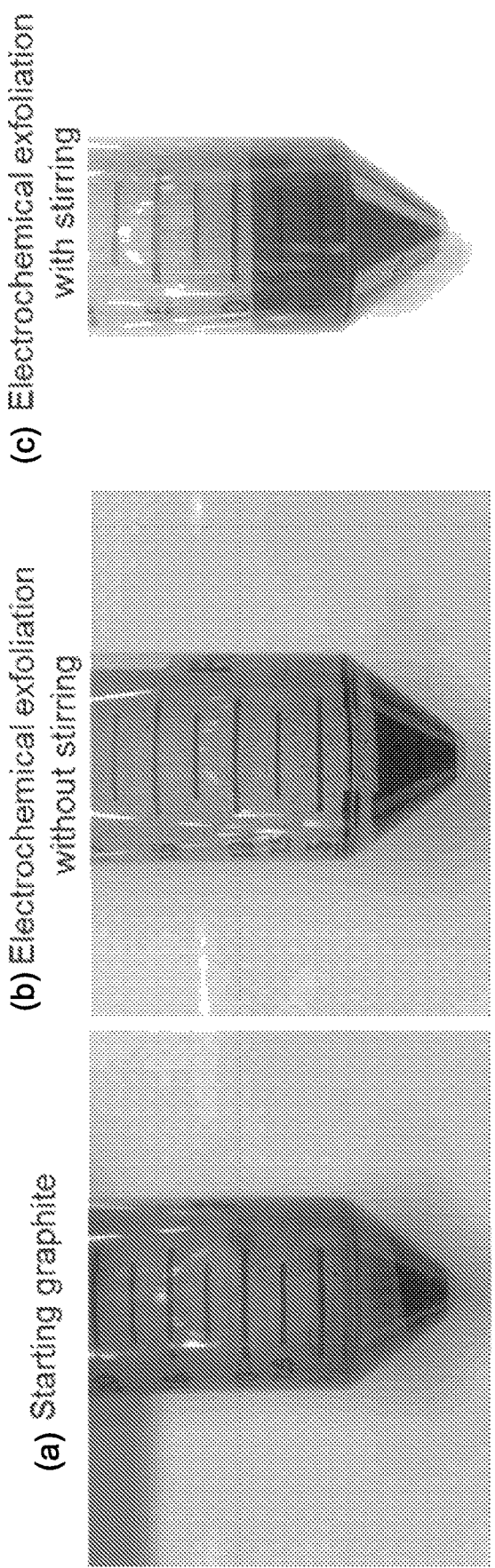
FIG. 2 illustrates the large volume expansion of graphite flakes after electrochemical exfoliation with stirring in comparison, showing the graphite (a) before electrochemical exfoliation; (b) product of control experiment without stirring; and (c) product of experiment of present invention with stirring.
Figure 3:
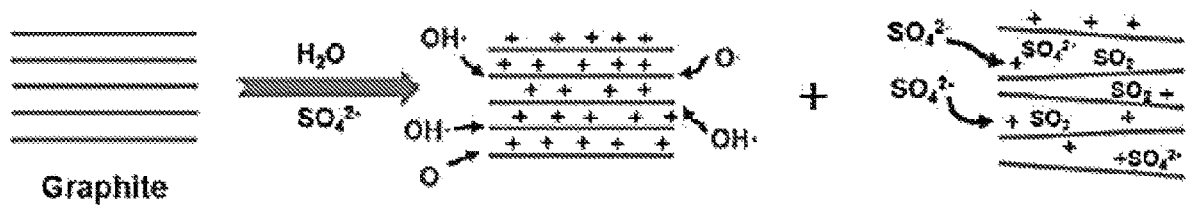
FIG. 3 provides a schematic diagram of the stages of intercalation of $SO_4^-$ ions during electrochemical exfoliation.

FIG. 2 illustrates the large volume expansion of graphite flakes after electrochemical exfoliation with stirring in contrast to control experiment without stirring. Furthermore, a schematic diagram of the stages of intercalation of $SO_4^-$ ions during electrochemical exfoliation are shown in FIG. 3.

The method of the present invention therefore has at least the following advantages:

1. The direct use of loose graphite flakes and even as-mined graphite flakes (much easier to produce larger volumes) avoiding the use of high cost bulk graphite;
2. High degree of ability to control the nature and density of defined functional groups on the graphene sheets
3. High reproducibility and scalability; and
4. Possibility to convert the batch process to a continuous process.

The process or method of the present invention can produce a high quality graphene oxide having a composition that cannot be produced by any other prior GO production method. The present invention therefore also relates to a new chemically defined, strategically-useful electrochemical-derived Graphene Oxide (EGO) where the oxygen functionalities are substantially in the form of hydroxy (alcohol) or epoxy.

Figure 4:
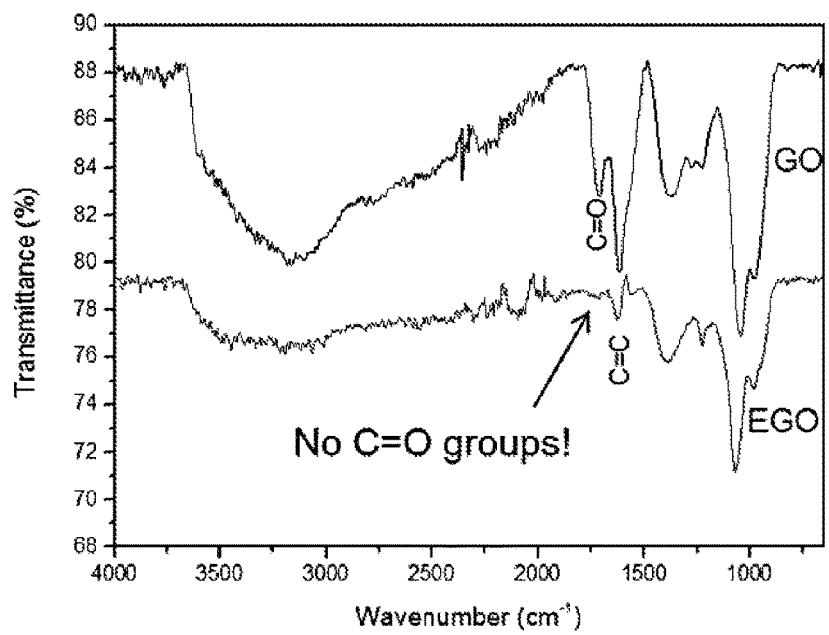
FIG. 4 shows representative infrared spectroscopy results for a electrochemical graphene oxide (EGO) produced by the method of the present invention.
Figure 5:
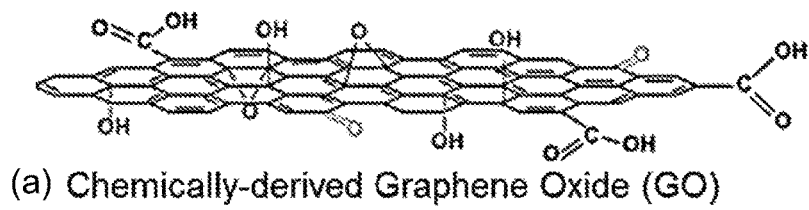
FIG. 5 provides a schematic comparison of representative structures of (a) chemically-oxidised graphene oxide; and (b) graphene oxide (EGO) produced by the present invention.
Figure 5:
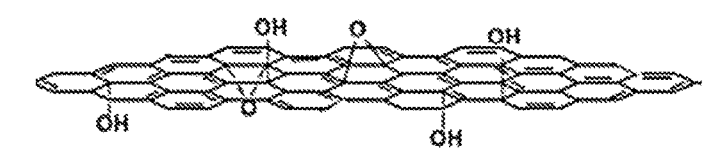

The graphene oxide of the present invention includes oxygen functionalities which substantially include no carbonyl functional groups C=O groups which are typically present in chemically-oxidised graphene oxide, as for example shown in the infrared spectroscopy results shown in FIG. 4. The graphene oxide produced by the present invention rather consists essentially of hydroxy and epoxy groups. This is due to the nature of electrochemical oxidation which predominantly occurs by the attack from hydroxyl radicals on the graphite edges as well as basal planes. A comparison of representative structures of chemically-oxidised graphene oxide and graphene oxide produced by the present invention (ECO) is provided in FIG. 5.

The graphene oxide graphene oxide of the present invention exhibits unique properties:

a. Enhanced dispersibility compared to other electrochemical methods; and
b. Thermally sensitive oxygen functional groups (epoxy, hydroxyl) allow the use of simple thermal reduction at low temperature (200° C.) to form highly conductive graphene sheet.

As described in the following examples, and shown in Table 1, the graphene oxide formed from the method of the present invention has a high conductivity (conversely low resistance), obtained through simple thermal reduction. Other applications that could capitalise on the advantage of the facile reduction to afford highly conducting graphene are lithium ion battery and transparent conducting electrodes. In comparison, a control chemically-derived graphene oxide remained insulation after the same thermal reduction treatment.

TABLE 1

Conductivity comparison of conventional and inventive GO

| Conductivity | EGO | Conventional GO |
|---|---|---|
| As produced | 900 kΩ | >1 MΩ |
| After 200° C. | <10 Ω | >1 MΩ |

EXAMPLES

Example 1—Mechanically-Assisted Electrochemical Method

Experimental
Materials:

The graphite flakes used in the experiments were purchased from Sigma-Aldrich (Product Number 332461). All chemicals were obtained from Sigma-Aldrich and used as received or diluted to the required concentration with ultrapure water.

Mechanically-Assisted Electrochemical Method:

As illustrated in FIG. 1, a electrochemical setup 100 was used which contained the basic electrochemical components—working electrode 125, counter electrode 145, electrolyte 115 (50 vol. % sulfuric acid) and power supply 140, with an additional magnetic stirrer 162 and spin bar 161 (FIG. 1). A graphite container 110 was used to contain the graphite flakes comprising an inversed 50 mL centrifuge tube, caped with a PVDF membrane (0.6 µm pore, Durapore, Millipore) immersed in the electrolyte. The graphite container 110 contained a cylindrical platinum mesh (PT008710, Goodfellow Cambridge Ltd., UK) working electrode 125 placed around the inner wall of container 110. A magnetic Teflon spin bar 161 was placed together with loose graphite flakes 120 (typically 200 mg) inside the container/tube 110. A platinum mesh or wire counter electrode 145 was placed in the 250 mL beaker/outer container 150 outside the graphite container 110. The PVDF membrane kept the graphite and graphene oxide product inside the graphite container 110 but allowing ions and electrolyte to pass though. A typical laboratory magnetic stirrer 162 was used to control the revolution of the magnetic spin bar 161.

Figure 6:
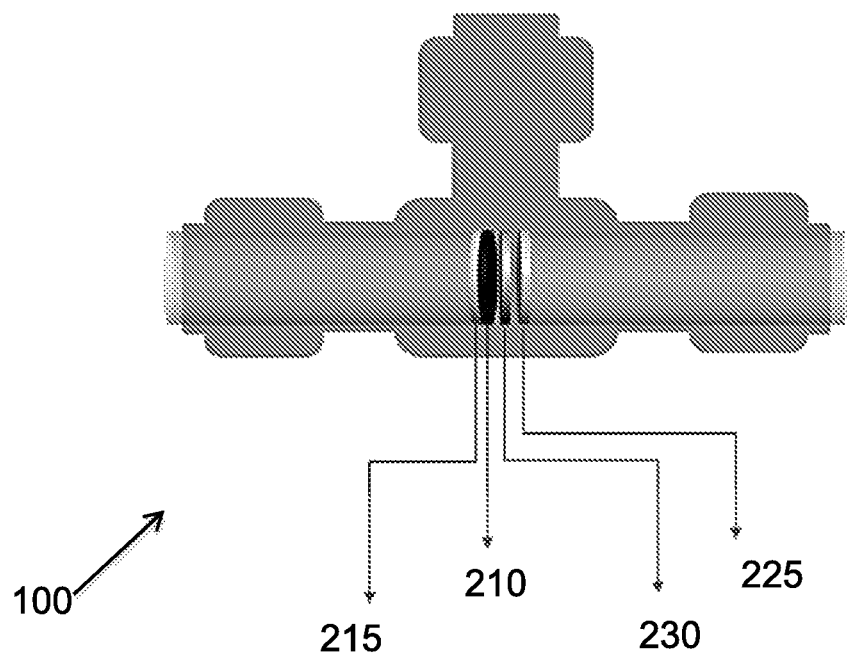
FIG. 6 provides a schematic drawing of the control graphene oxide electrochemical setup.

Comparison/Control "T-Cell" Method:

As a control experiment for non-mechanically assisted electrochemical method and a quick way to evaluate the effect of different electrolyte, electrochemical-derived Graphene Oxide (EGO) was also prepared in a two-electrode Swagelok Tee cell 200 shown in FIG. 6 using a microcurrent galvanostatic method. The sample for the anode was a graphite disk 210 obtained by pressing graphite flakes (pressure: 100 bar), without any binder, into a pellet of 13 mm diameter and 185 µm thickness. The mass of the disk 210 was about 40 mg and was placed in contact with a round platinum working electrode 215. A round platinum plate (13 mm diameter) served as the counter electrode 225. The graphite foil or disc 210 was separated from the counter electrode 225 by a short separator tube 230. During the preparation process, a current density of I=50 µA/mg was given to the cell 200 for different periods. The graphite disk 210 was gradually intercalated and oxidised in 70% perchloric acid. After the electrochemical oxidation process, the solid was washed repeatedly with water via centrifugation until neutral pH was obtained.

For further comparison, chemically-derived graphene oxide (CGO) was synthesized by a modified Hummers method as originally reported by Kovtyukhova N I, Ollivier P J, Martin B R et al. (Layer-by-layer assembly of ultrathin composite films from micron-sized graphite oxide sheets and polycations. Chemistry of Materials 1999; 11:771-778) the contents of which should be understood to be incorporated into this specification by this reference.

Characterization:

The X-ray diffraction (XRD) patterns were recorded on a Philips 1130 X-ray diffractometer (40 kV, 25 mA, Cu Kα radiation, λ=1.5418 Å) at room temperature. The data were collected from 5° to 40° with the scan rate of 2° min$^{-1}$ and steps of 0.02°. Attenuated total reflectance (ATR) FTIR measurements were carried out on a PerkinElmer Spectrum 100 system coupled with a universal ATR accessory (diamond/ZnSe ATR crystal).

Thermogravimetric analysis (TGA) of sample was performed on a Thermogravimetry/Differential Thermal Analyzer (TG/DTA) 6300. The sample was heated under argon atmosphere from 30° C. to 700° C. at 5° C. min$^{-1}$. The electrical conductivity measurement for the EGO films (diameter: 35 mm, thickness: 80 µm) was carried out on a Jandel 4-point conductivity probe by using a linear arrayed four-point head.

SEM images were obtained using a Nova 450 and JEOL JSM 7001F scanning electron microscope. X-ray photoelectron spectroscopy (XPS) analysis was performed using an AXIS Ultra DLD spectrometer (Kratos Analytical Inc., Manchester, UK) with a monochromated Al Kα source at a power of 180 W (15 kV×12 mA).

Results

Mechanically-assisted electrochemical production of electrochemical-derived Graphene Oxide (EGO): The typical electrochemical condition is applying 1 A current for 24 hours, employing 200 mg graphite in 50 vol. % $H_2SO_4$ electrolyte for the laboratory setup shown in FIG. 1. During the electrochemical process, a constant positive current (1 A) was applied to the working electrode—platinum mesh. At the same time, the spin bar was rotating, creating a graphite slurry vortex in the tube container and pushing the graphite flakes towards the Pt mesh in the centrifuge tube. As a result, close physical/electrical contact of graphite flakes with working electrode was created. The graphite flakes were positively charged and resulting in electrochemical oxidation and exfoliation. In addition, the shear force in slurry vortex assisted in exfoliation of oxidized graphene layers. After the reaction (24 hours), the exfoliated and oxidized EGO product was washed repeatedly with water via centrifugation until the pH of the EGO dispersion is higher than 6.0. FIG. 2 shows the volume expansion of graphite flakes after electrochemical exfoliation with stirring in contrast to control experiment without stirring.

Figure 7:
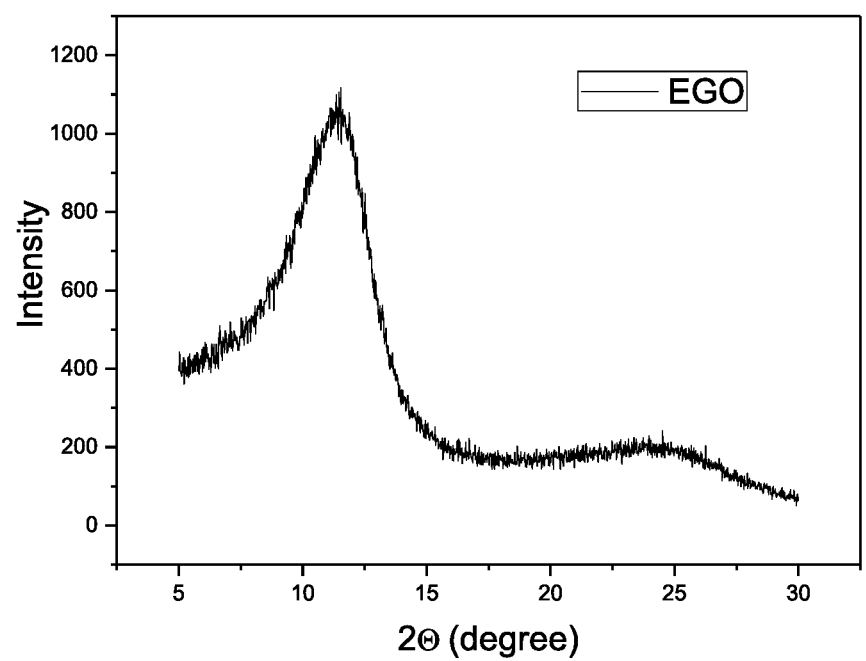
FIG. 7 shows X-ray diffraction pattern of an electrochemical graphene oxide (EGO) produced by a mechanically-assisted electrochemical method according to one embodiment of the present invention.

FIG. 7 shows the XRD pattern of the EGO product which confirmed the conversion of graphite (XRD peak at 25.6°) to graphene oxide (XRD peak at) 11.4° due to the increase in the inter-gallery spacing caused by the presence of oxygen functional groups on graphene oxide.

Figure 8:
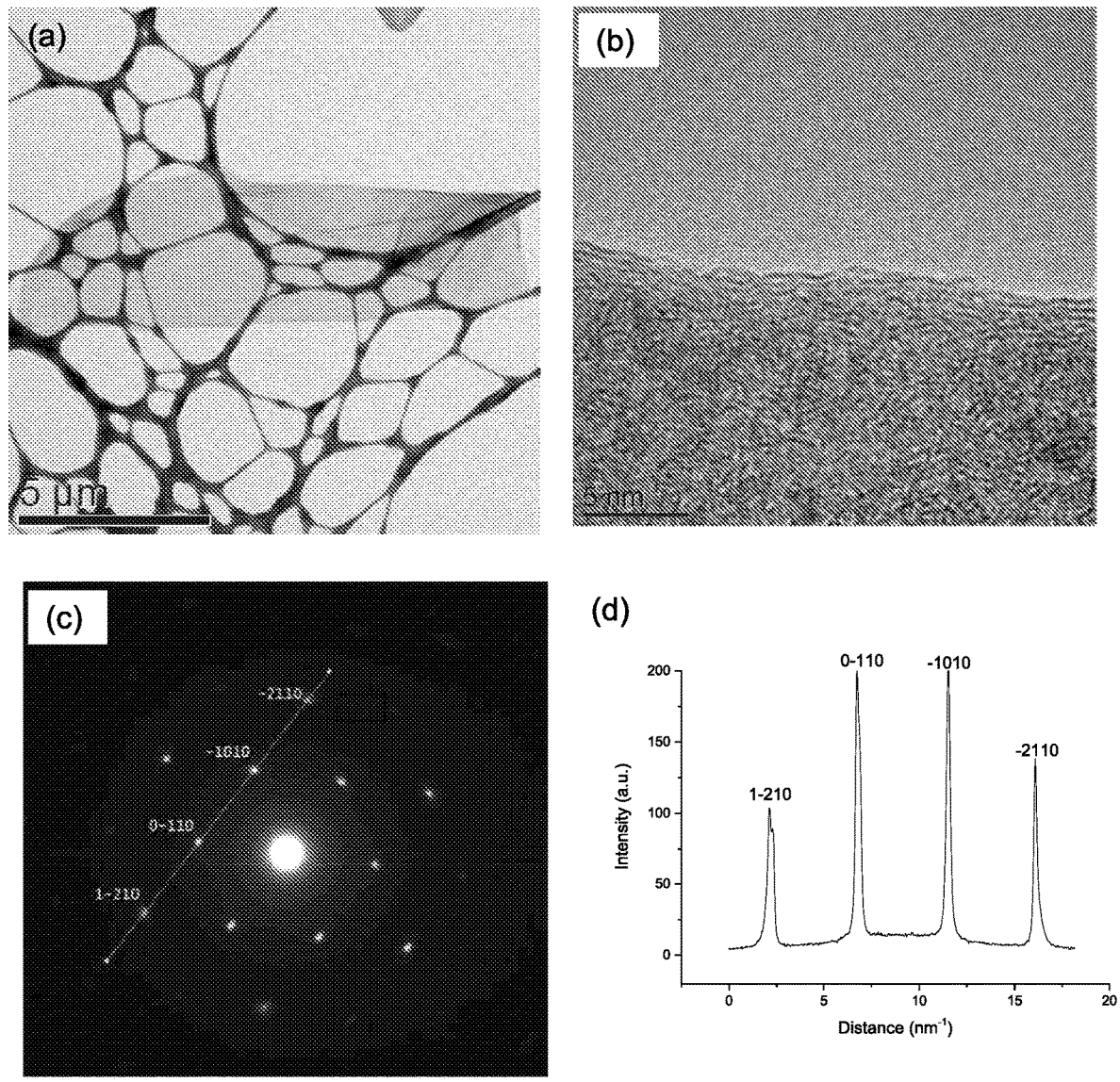
FIG. 8 provides (a) TEM images of a typical inventive EGO sheet; (b) High-resolution TEM image showing edge of EGO sheet from (a); (c) Electron diffraction pattern taken from EGO sheet from (a); and (d) Diffracted intensity taken along the 1-210 to -2110 axis for patterns shown in (c).

Morphological and Structural Characterisations:

The morphology of EGO was investigated by transmission electron microscopy (TEM) by dipping holey carbon grids into EGO dispersion. FIG. 8a shows a typical EGO sheet with lateral size of about a few micrometres. Folded and scrolled edges could be observed, which is the characteristic of flexible single sheet graphene. Zooming in at the edge of the EGO sheet as shown in FIG. 8b, the observed single fringe proves the presence of a single layer EGO. From FIG. 8c, a typical 6-fold symmetric diffraction pattern is observed. The intensity of diffraction spot from the (0-110) plane is more intense than that from the (1-210) plane (FIG. 8d), thus further confirming the observed EGO was single layer.

Figure 9:
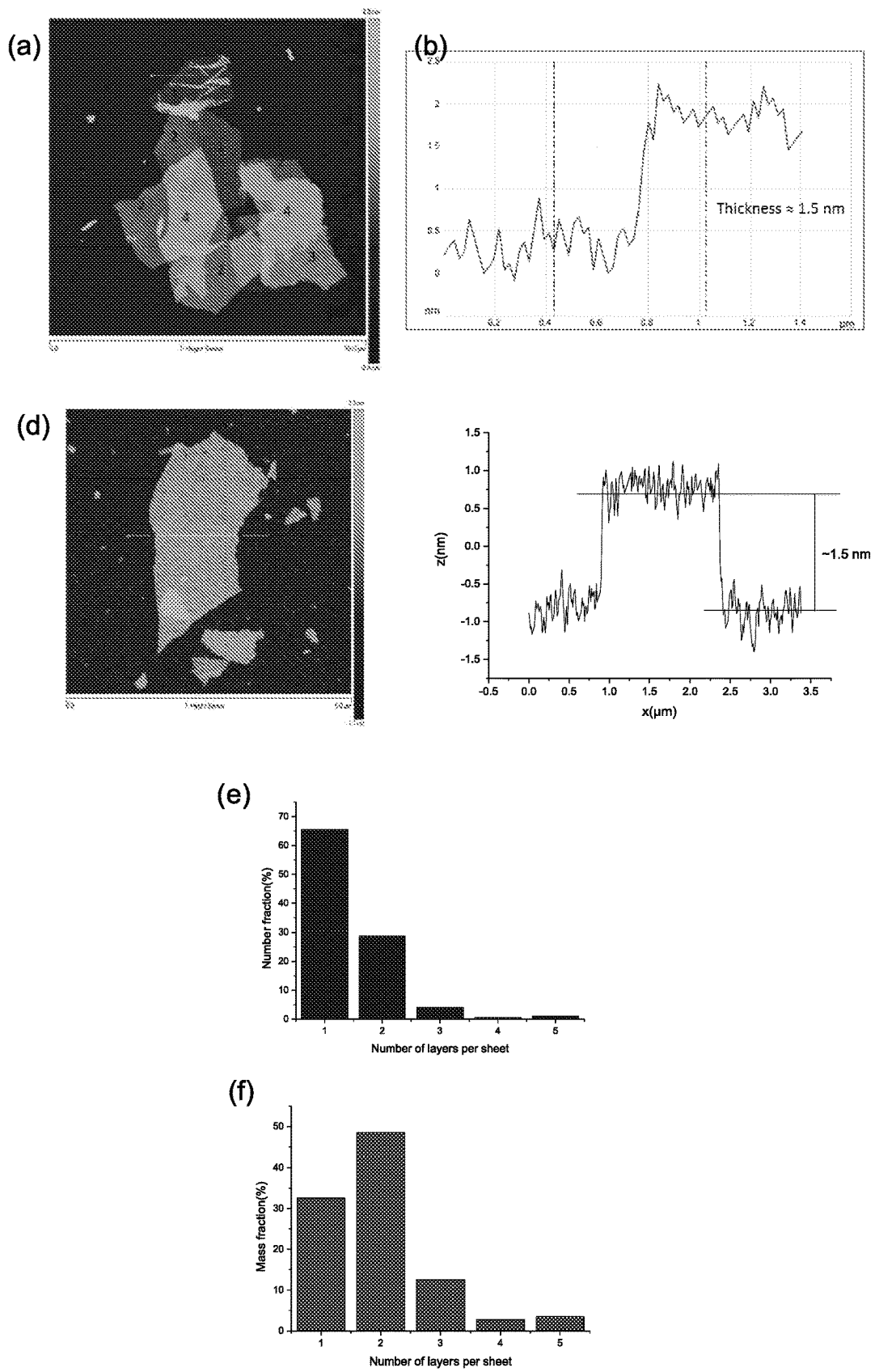
FIG. 9 provides (a) AFM image of several stacked inventive EGO sheets; (b) Histogram of top EGO sheet in (a); (c) AFM image of one monolayer EGO sheet; (d) Histogram of EGO sheet in (c); (e) Number fraction of thickness of EGO sheets; and (f) Mass fraction of thickness of EGO sheets.

To further examine the thickness of EGO sheets, atomic force microscopy (AFM) was employed. FIG. 9a shows several stacked EGO sheets with different thicknesses. In the top of the AFM image, a folded and crumpled EGO sheet was observed which is the characteristic of single-layered EGO. By drawing a line height profile across the EGO flake as shown in FIG. 9b, the thickness of the EGO sheet was found to be 1.5 nm. This shows the presence of oxygen functional groups on EGO sheet. By measuring the thicknesses, layer numbers of different EGO sheets or stacked parts were labelled in FIG. 9a. Another typical single-layer EGO sheet with thickness of about 1.5 nm is shown in FIGS. 9c and d. To estimate the fraction of monolayer EGO in the products, several AFM images are analysed to generate the thickness statistics. Number fractions of EGO sheet with different layer numbers are calculated as shown in FIG. 9e. It can be found from the data that number fraction of monolayer EGO in product is about 66%. To calculate the mass fraction, the areas of all the graphene sheets are measured and Equation 1 is used. The mass fraction of monolayer EGO sheet in product is about 33 wt %. However, it is important to note that the few-layered EGO are in the multiple of 1.5 nm (thickness of single sheet EGO), and this indicates that the EGO products are all well-oxidised and existed as few-layered EGO due to incomplete exfoliation or slight agglomeration during the processing step.

$$\frac{M_{Ind}}{M_T} = \frac{\sum_{Individuals} A_{monolayer}}{\sum_{Allflakes} N_{monolayer} A_{monolayer}} \quad (1)$$

$M_{Ind}$ is the mass of all monolayer graphene. $M_T$ is the mass of all EGO sheets.

Figure 10A:
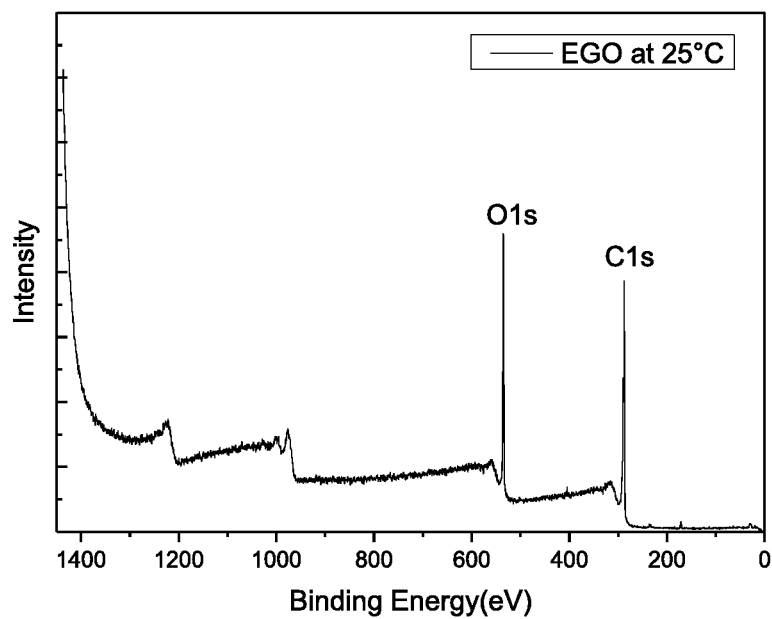
FIG. 10 shows (a) XPS Survey spectra of inventive EGO produced by a mechanically-assisted electrochemical method according to one embodiment of the present invention at room temperature; (b) Carbon and oxygen content of EGO after heating at different temperatures; and (c) XPS C 1s spectra of EGO (d) C=C, C—O/C—O—C, COOH concentration in EGO after heating at different temperatures.
Figure 10B:
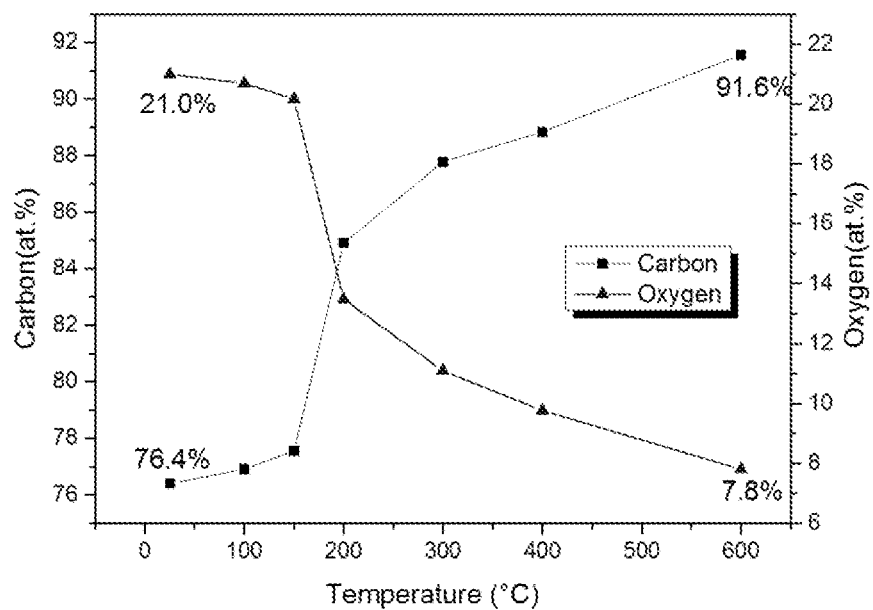
Figure 10C:
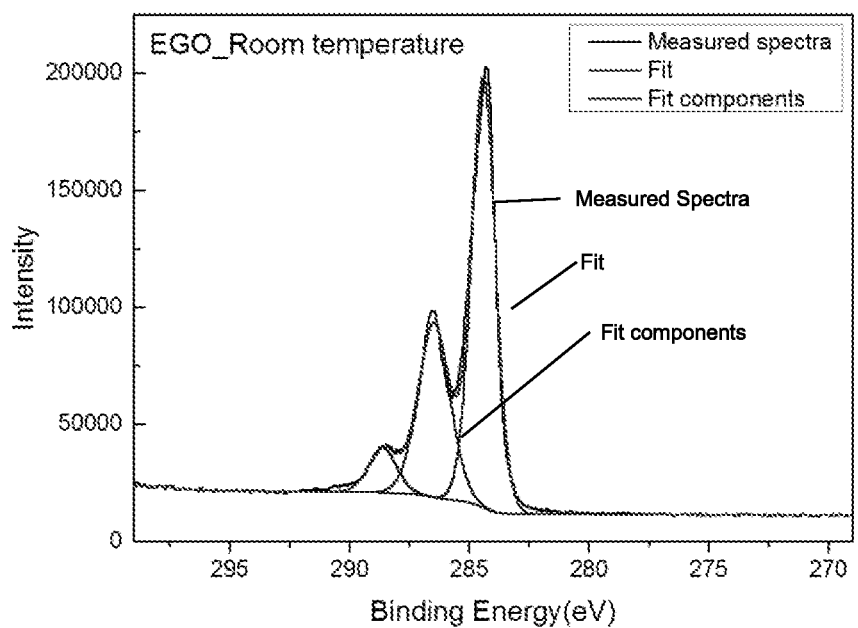
Figure 10D:
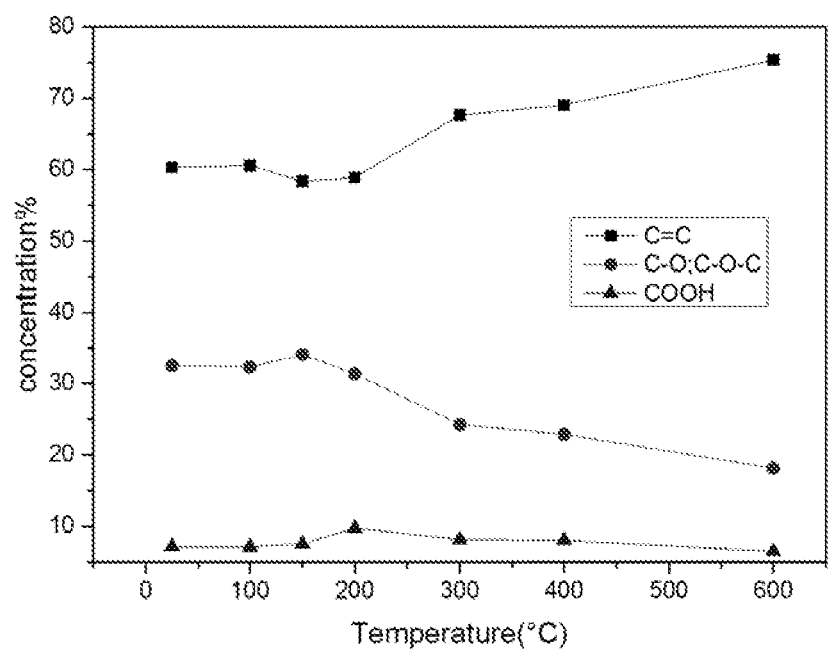

Chemical Composition of EGO:

FIG. 10a shows the X-ray photoelectron spectroscopy (XPS) survey spectra of EGO without heating. The carbon and oxygen contents in EGO after heating at different temperatures are shown in FIG. 10b, which are calculated from the peak ratio in FIG. 10a with correction with respect to their atomic sensitivity factors. As produced EGO sheet contained approximately 21.0 atom % oxygen and 76.4 atom % carbon. With increase heating temperature (in ultra-high vacuum), oxygen content decreased to 7.8 atom % and carbon increased to 91.6 atom % after heating at 600° C. The significant change in atomic composition occurred at about 200° C., which shows the facile thermal deoxygenation of EGO at this temperature. FIG. 10c shows the high resolution XPS C 1s spectrum of EGO at room temperature, where three carbon components can be fitted to the curve. They indicated the presence of C=C (60.3 atom %), C—O/C—O—C (32.5 atom %) and COOH (7.2 atom %) functional groups. During thermal annealing, C=C content increases and C—O/C—O—C decreases, showing the elimination of oxygen functional groups by heating.

Figure 11:
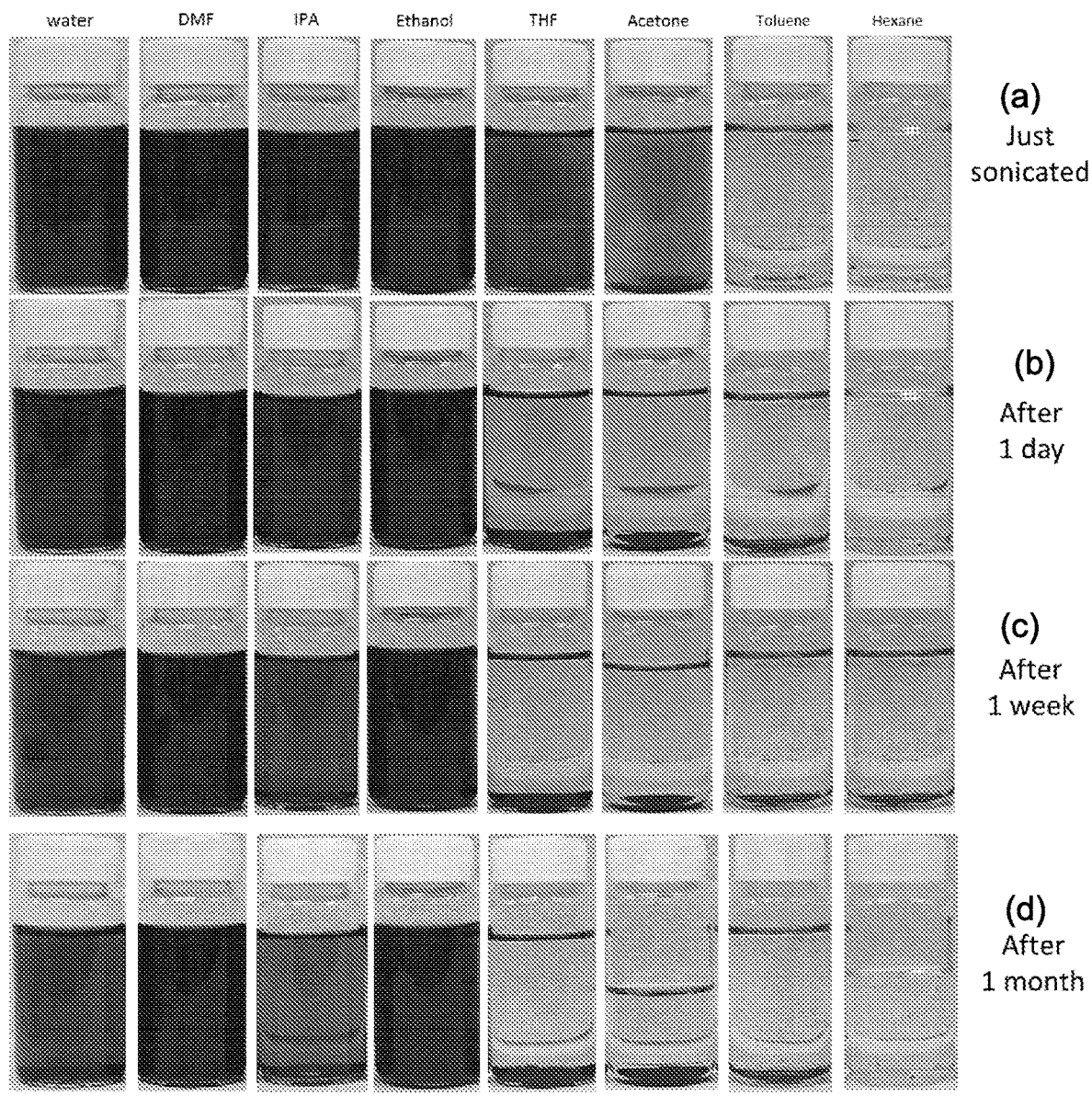
FIG. 11 shows inventive EGO material dispersion in solvents: water, DMF, IPA, ethanol, THF, acetone, toluene, hexane after just sonicated, 1 day, 1 week, and 1 month.

Dispersibility of EGO:

EGO was dispersed by sonication in different solvents: water, DMF, IPA, ethanol, THF, acetone, toluene, hexane. FIG. 11 shows the photographs of all the dispersions immediately after sonication, 1 day, 1 week and 1 month after sonication. For the "just sonicated" samples, it was observed that EGO could be well-dispersed in water, DMF, IPA and ethanol, but not in THF, acetone, toluene and hexane. After 1 month, sedimentation of EGO was observed in IPA dispersion and water dispersion but not in DMF and ethanol dispersion. This shows the long-term stability of EGO in DMF and ethanol.

Figure 12:
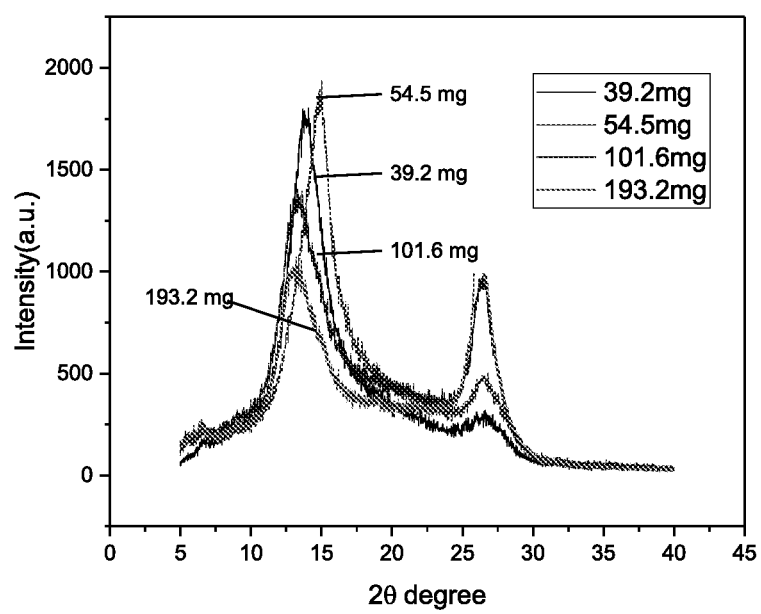
FIG. 12 shows X-ray diffraction pattern of inventive EGO product with different graphite mass loading via the control "T cell" method.

"T Cell" Method:

The electrochemical method was carried out in a Swagelok "T cell" configuration 200 (static environment) shown in FIG. 6 as a control experiment in comparison to the mechanically-assisted method, and also to study the electrochemical mechanism and a quick way to evaluate the effect of electrolytes. As shown in FIG. 12, the optimum graphite mass loading was limited to less than 40 mg which showed that most of the graphite (XRD peak at 25.6°) was converted to graphene oxide (XRD peak at around 15°). Beyond the optimum graphite mass loading, the conversion percentage decreased drastically which showed that the static method is not scalable and mechanical stirring is critical for the complete conversion of graphite to graphene oxide.

Figure 13:
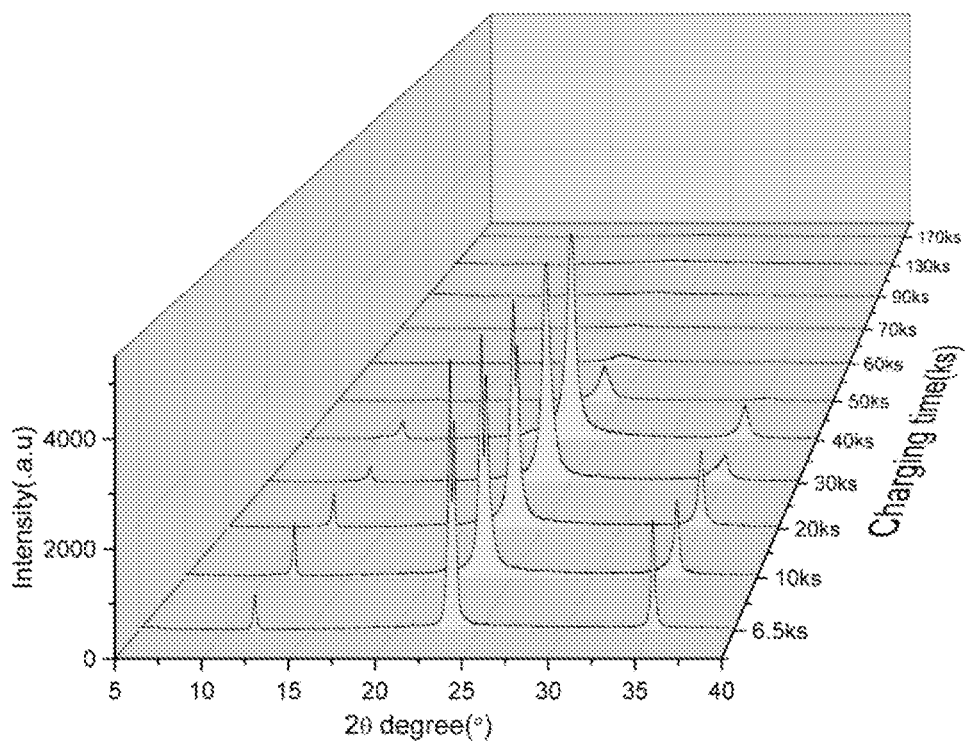
FIG. 13 shows X-ray diffraction patterns of oxidized graphite from different charging period. The samples were tested immediately after reaction without any treatment.

To study the electro-oxidation mechanism and the effect of other electrolyte (70% perchloric acid), the graphite disk was electro-oxidised for a series of time intervals and characterised via XRD immediately. The graphite disk taken from the electrolytic cell after 6.5 kiloseconds (ks) of anodic oxidation showed a XRD pattern typical for the stage-1 $HClO_4$-GIC (FIG. 13). The (002) diffraction peak at 23.2° 2θ angle along with the (001) and (003) signals at 11.8° and 35.2° can be unambiguously assigned to the stage-1 $HClO_4$-GIC. After 50 ks oxidation, the stage-1 $HClO_4$-GIC signals were still observable, but were broadened. When charging occurred for 60 ks, the (001) and (003) diffraction peaks disappeared and the (002) diffraction peak became even broader, which indicated that the graphite was extensively exfoliated.

Figure 14:
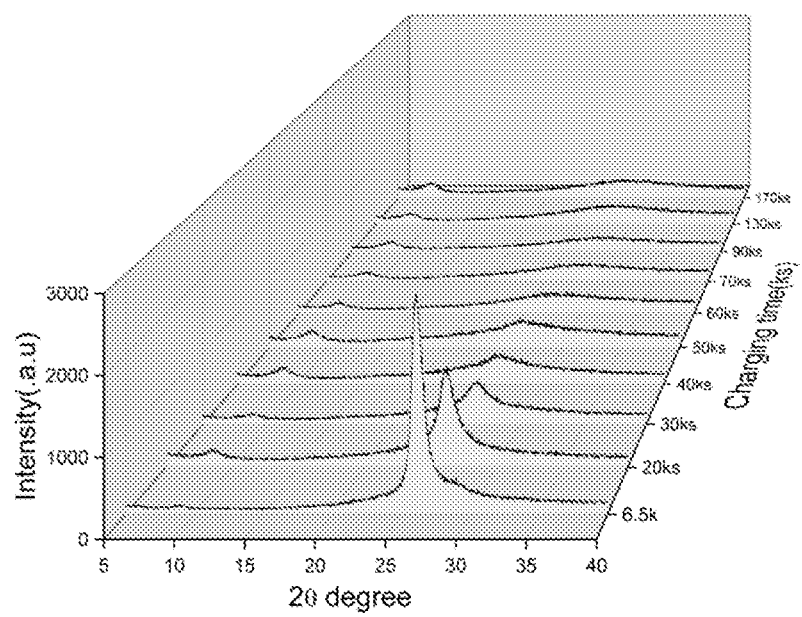
FIG. 14 shows XRD patterns of oxidized graphite from different charging period. The oxidised samples were immersed in water overnight without any sonication after anodic oxidation.

After immersion of the EGO samples in water overnight, a new diffraction peak at around 8.5° was observed for all the samples except for 6.5 ks sample, as shown in FIG. 14. This diffraction peak could be attributed to the existence of oxygen containing functional groups. Besides, (002) diffraction angle of all the oxidised samples shifted to 26.6° and the width of (002) diffraction peak increased with charging time, especially for the samples after 50 ks charging, the (002) diffraction peak could hardly be seen. This illustrated that almost no stacked multilayer graphene existed after prolonged reaction time. The role of water in this immersion process can be interpreted in one of the following two ways: 1) immersion of the oxidised samples in water would decrease the solvated acid content in the samples simply by diffusion, due to the concentration gradient of solvated acid between oxidized samples and water, thus improving the crystallinity, or 2) the addition of water could accelerate the hydrolysis of the oxidised samples, which will eventually lead to their conversion into EGO.

Figure 15:
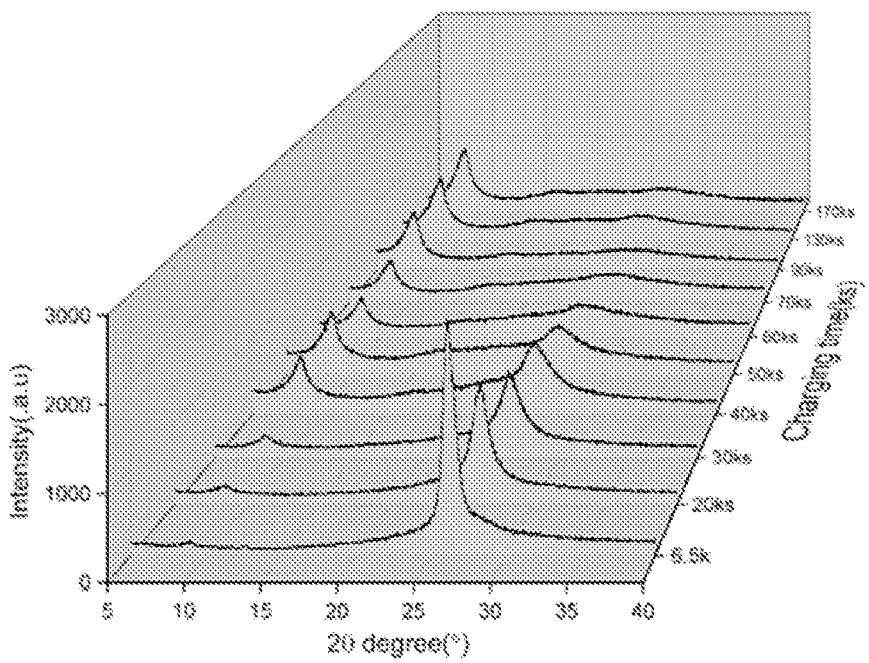
FIG. 15 shows XRD patterns of oxidized graphite from different charging period. After anodic oxidation, the oxidized samples were washed repeatedly with water until the pH is close to 7.

The oxidised samples were continuously washed with water, in order to fully remove the residual acid, and the resulting samples were characterized by XRD again, as shown in FIG. 15. Generally, the curves in FIG. 15 are similar to the curves in FIG. 15, in terms of their trend and 2θ diffraction angles, but the difference is that the graphene oxide diffraction peak in FIG. 15 is sharper and more pronounced. This indicated that the oxidised samples restacked better after being washed with water.

Figure 16:
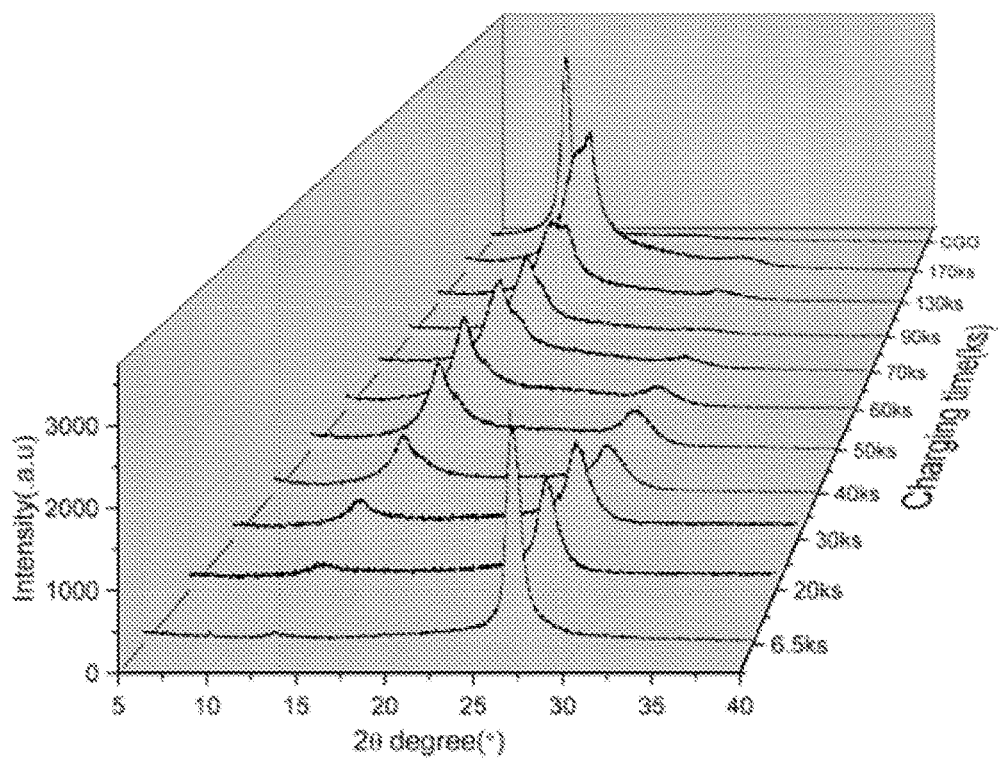
FIG. 16 shows X-ray data of chemically derived graphene oxide (CGO) and oxidized graphite from different charging period. After anodic oxidation, the oxidized samples were washed with water several times until the pH value of the supernatant is close to 7, and then were dried at 50° overnight.

FIG. 16 shows the XRD spectra of washed samples after drying in vacuum oven. As shown in FIG. 16, EGO samples had broader diffraction peaks with smaller interlayer d-spacing (6.0-6.7 Å), compared with that of CGO (8.37 Å), which may due to the lesser amount of functional groups on EGO. There are two major differences between the wet oxidised samples and dried oxidised samples. Firstly, the diffraction peak at 26.5° was visible for all the dried samples, even though it was very broad for the oxidized sample after 60 ks' reaction. Secondly, the previous diffraction peaks at around 8.5° in FIGS. 14 and 15 moved to higher angles. The intensity of the diffraction peak correlated with the larger diffraction angle became strong with the increasing reaction time. There are two possible reasons: Firstly, when the water went away from the gallery of oxidized samples by heating, the interlayer space will shrink, which could finally lead to the shift of the diffraction angles. Secondly, there are many different oxygen containing functional groups on the carbon plane, and these different functional group may cause different expansion of interlayer space between graphene layers.

Figure 17A:
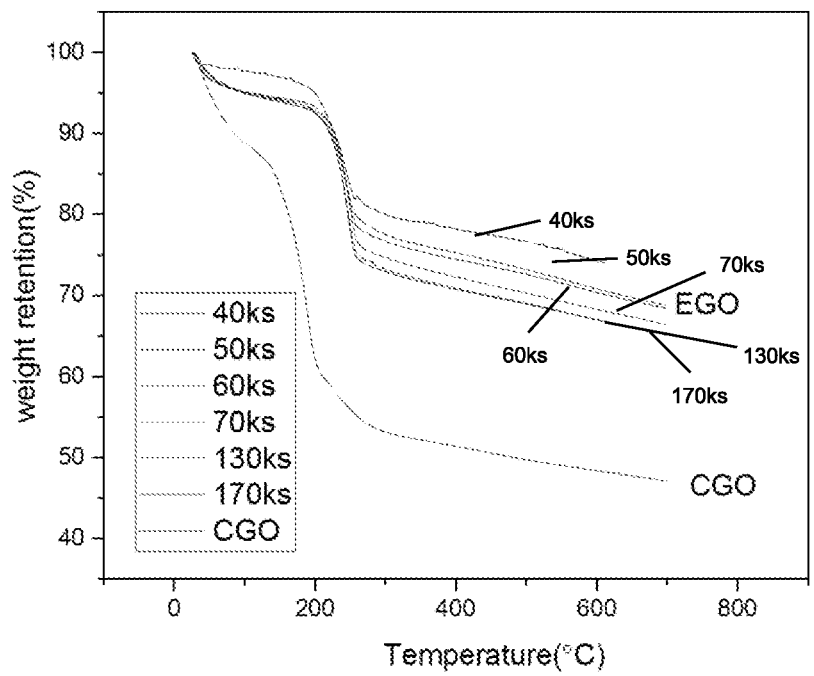
FIG. 17 shows TGA curve of CGO and inventive EGO samples at (a) different reaction period and (b) their respective weight loss at 300° C.
Figure 17B:
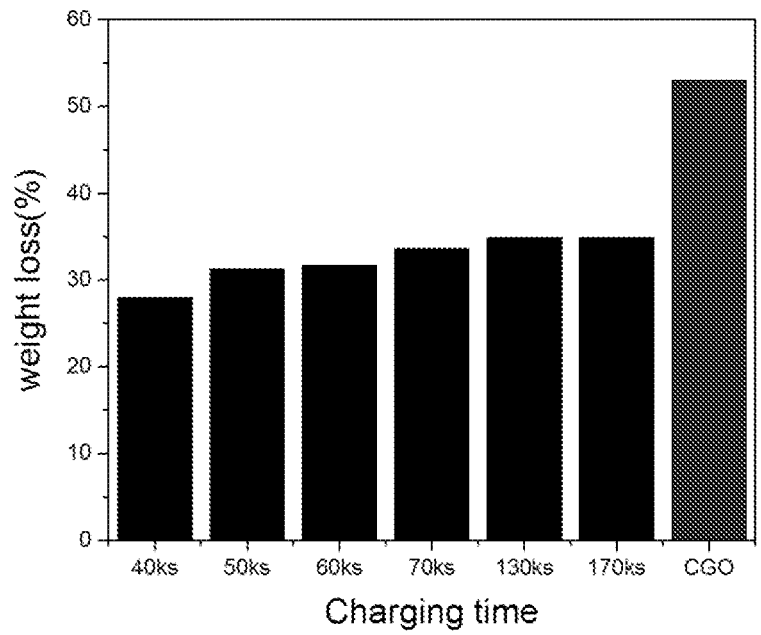

In order to further confirm the relationship between the oxidation degree of EGO samples and charging time, TGA was employed to quantify the relative amount of functional groups on different EGO samples. FIG. 17 shows the weight loss profiles of different EGO samples and CGO in an inert atmosphere. As seen from FIG. 17, the longer charging time corresponded to lower weight retention at 700° C. (from 65.1 wt. % to 72 wt. %). It should also be pointed out that the weight retention did not change much beyond the charging of 70 ks. As comparison, the value of the lowest weight retention of EGO sample was higher than the graphite oxide prepared by Brodie's method (56.7 wt %) and CGO (47 wt %). The first order derivative of TGA curves can also be calculated from the original TGA data and the significant weight loss occurred at around 250° C., which is higher than the samples prepared by Hummers' method (202° C.), but lower than Brodie's method (281° C.).

Figure 18:
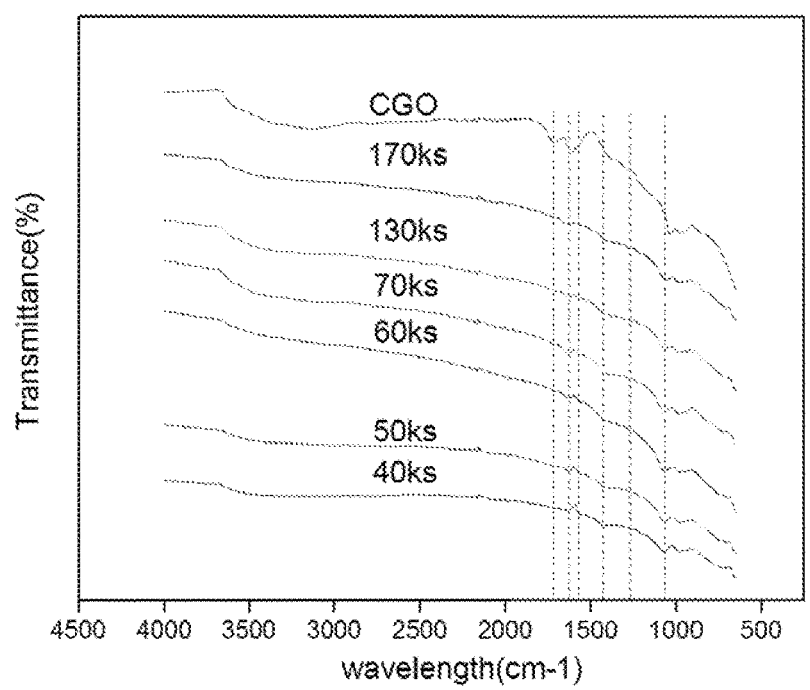
FIG. 18 shows ATR-FTIR spectra of inventive EGO samples at different reaction period and CGO.

The presence of various EGO oxygen containing functional groups can be confirmed by the analysis of their FTIR spectra as shown in FIG. 18. The dominant peaks corresponding to C—O, C—OH, C=O and O—H stretching were observed at approximately 1070, 1420, 1715 and 3500 $cm^{-1}$, respectively. The peak at about 1568 $cm^{-1}$ corresponded to $sp^2$-hybridized C=C in plane stretching and the 1620 $cm^{-1}$ peak was due to carboxyl (COOH and/or $H_2O$) vibrational modes. However, the relative intensity of some peaks was remarkably different, which indicated that the different synthesis methods result in different chemical functionalities on the carbon plane. In comparison to CGO, EGO samples exhibited extremely weaker spectral features at 1715 $cm^{-1}$, which means that the amount of C=O is relatively small. It was observed that CGO with higher oxidation degree, had a corresponding stronger C=O peak stretching.

Figure 19:
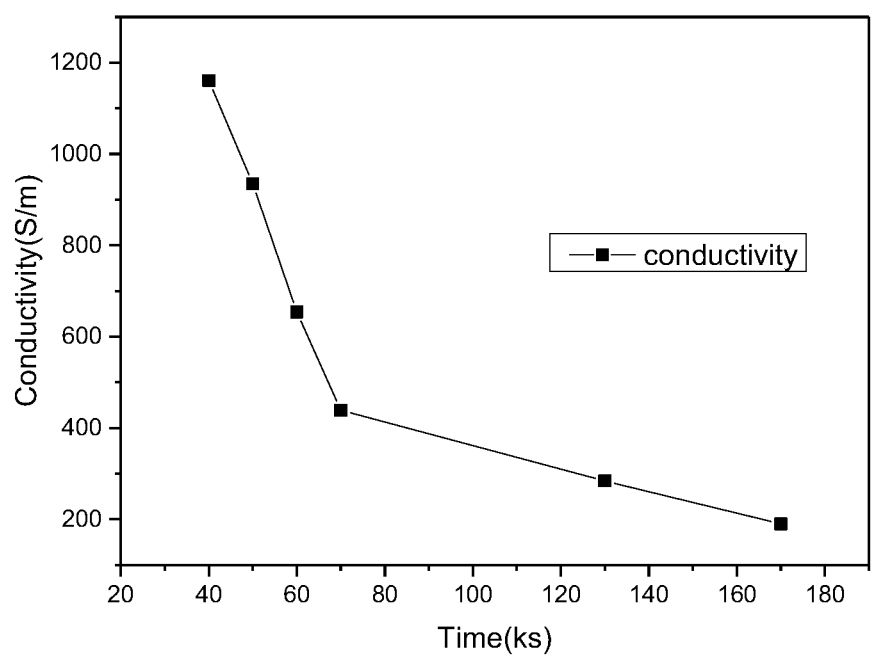
FIG. 19 shows electrical conductivity of inventive EGO samples at different reaction period.

From FIG. 19, the 4 point probe measurement shows that EGO was very conductive with conductivity in the order of $10^2$-$10^3$ S·$m^{-1}$, which is roughly seven or three orders magnitude more conductive than CGO, and even comparable with chemically converted graphene (CCG). The conductivity decreased with the increasing electro-oxidation/ reaction time which is consistent with the formation of more functional groups on the graphene.

Conclusion

A novel mechanically-assisted electrochemical production of graphene oxide was demonstrated and it was found that the mechanical assistance enabled the scalable production of electrochemically-derived graphene oxide (EGO). The scalable electrochemical production of graphene oxide was not possible in a static configuration as evident from the incomplete conversion to graphene oxide with the increase in graphite mass loading. The as-produced EGO was found to be predominantly single layer graphene oxide with good and stable dispersibility in ethanol and DMF. Through various characterizations, EGO exhibited lesser oxygen-containing functional groups, in particular, lesser carboxyl (COOH) functional groups which are known to be located at the graphene sheet edges or hole edges. Investigation with a more oxidising acid (perchloric acid) compared to sulfuric acid, showed similarly milder oxidative effect compared to traditional harsh chemical oxidative methods (e.g. Hummers and de Broglie methods). The non-explosive and scalable nature of the mechanically-assisted electrochemical production method will be highly sought after by industries and offers greater control of the graphene oxide products which will be explored in future work.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The invention claimed is:

1. A method of producing graphene oxide comprising:
locating loose graphite particles within an electrochemical cell having a working electrode, counter electrode, and an aqueous acid electrolyte, the working electrode being positioned within the electrolyte to contact at least a portion of the graphite particles, wherein the working electrode includes a conductive mesh, the electrochemical cell includes a graphite container comprising a glass cylindrical container, and the glass cylindrical container has a base formed from a piece of acid-resistant membrane with pore size of <1 μm to retain graphite and graphene oxide particles within the graphite container, the working electrode is placed inside the graphite container the graphite particles are located, and retained within the graphite container, and separated from the counter electrode within the electrochemical cell;
agitating the graphite particles within the electrolyte to create a graphite slurry vortex; and
applying a potential difference between the working electrode and counter electrode, thereby resulting in electrochemical exfoliation and oxidation of the graphite particles to produce graphene oxide.

2. The method according to claim 1, wherein the graphite particles are agitated within the electrolyte by at least one of mechanical agitation or flow constriction.

3. The method according to claim 2, wherein mechanical agitation comprises stirring.

4. The method according to claim 1, wherein the agitation of the graphite particles within the electrolyte creates a shear force sufficient to assist in exfoliation of oxidised graphene layers.

5. The method according to claim 1, wherein agitation of the graphite particles within the electrolyte creates a flow velocity in the electrolyte of at least 0.1 m/s.

6. The method according to claim 1, wherein the membrane has a pore size of <0.8 μm.

7. The method according to claim 1, wherein the conductive mesh comprises a metal mesh.

8. The method according to claim 1, wherein the counter electrode comprises a conductive body.

9. The method according to claim 1, wherein the aqueous acidic electrolyte includes molecules and/or ions which facilitate the intercalation of graphite layers of the graphite particles.

10. The method according to claim 1, wherein the aqueous acidic electrolyte is selected from a group consisting of sulphuric acid, perchloric acid, nitric acid, phosphoric acid, and boric acid.

11. The method according to claim 1, wherein the graphite particles have an average particle size of from 10 μm to 25 mm.

12. The method according to claim 1, wherein the graphite particles comprise graphite flakes.

13. The method according to claim 1, wherein the potential difference between the working electrode and counter electrode provides a current of at least 1 A therebetween.

14. An apparatus for producing graphene oxide by electrochemical exfoliation of loose graphite particles, the apparatus including:

a fluid housing configured to house an aqueous acid electrolyte;

a working electrode being positioned within the electrolyte and configured to engage graphite particles located in the apparatus, wherein the working electrode includes a conductive mesh, the electrochemical cell includes a graphite container comprising a glass cylindrical container, and the glass cylindrical container has a base formed from a piece of acid-resistant membrane with pore size of <1 μm to retain graphite and graphene oxide particles within the graphite container, the working electrode is placed inside the graphite container the graphite particles are located, and retained within the graphite container, and separated from the counter electrode within the electrochemical cell;

a counter electrode separated from the working electrode and graphite particles;

a potentiostat for creating a potential difference between the working electrode and counter electrode; and an agitation arrangement, which in use, agitates the graphite particles within the electrolyte.

15. The apparatus according to claim 14, wherein the agitation arrangement comprises a mechanical agitation or a flow constriction.

16. The apparatus according to claim 14, wherein the conductive mesh comprises a metal mesh.

17. The apparatus according to claim 14, wherein the counter electrode comprises a conductive body.

18. The apparatus according to claim 14, wherein the aqueous acidic electrolyte is selected from a group consisting of sulphuric acid, perchloric acid, nitric acid, phosphoric acid, and boric acid.

* * * * *